Feb. 16, 1926.
R. B. FAGEOL
1,573,381
BUMPER BRACKET
Filed June 10, 1925
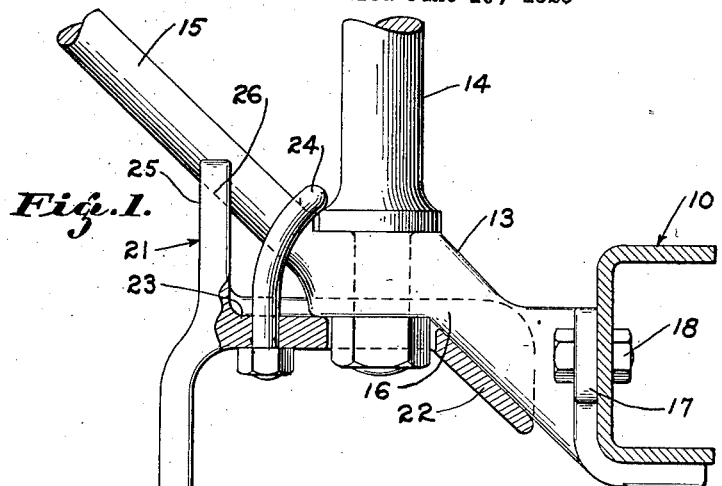
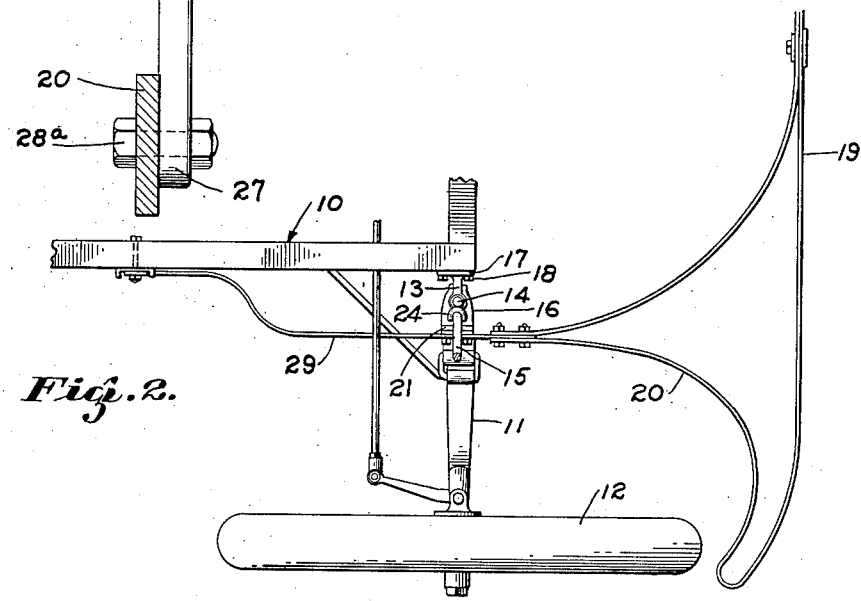
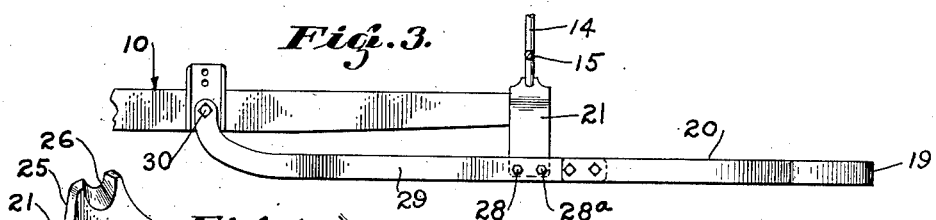
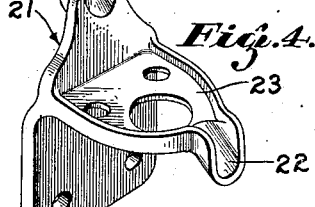
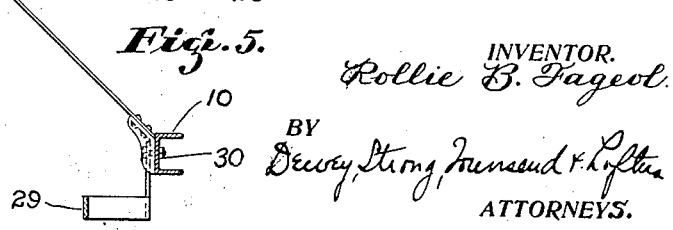
INVENTOR.
Rollie B. Fageol.
BY Dewey, Strong, Townsend & Loftus
ATTORNEYS.

Patented Feb. 16, 1926.

1,573,381

UNITED STATES PATENT OFFICE.

ROLLIE B. FAGEOL, OF LOS ANGELES, CALIFORNIA, ASSIGNOR TO AMERICAN CHAIN COMPANY, INC., OF BRIDGEPORT, CONNECTICUT, A CORPORATION OF NEW YORK.

BUMPER BRACKET.

Application filed June 10, 1925. Serial No. 36,098.

*To all whom it may concern:*

Be it known that I, ROLLIE B. FAGEOL, a citizen of the United States, residing at Los Angeles, county of Los Angeles, and State of California, have invented new and useful Improvements in Bumper Brackets, of which the following is a specification.

This invention relates to automobile bumpers and particularly pertains to a bracket for mounting the same upon a vehicle frame.

Considerable difficulty has been experienced in mounting automobile bumpers on the front of automobiles of the Ford type, and it is the principal object of the present invention to provide simple means whereby an automobile bumper may be supported transversely of an automobile of the Ford type by utilizing certain structural details of the automobile including the front lamp bracket post whereby the bumper may be readily mounted and rigidly held in position.

The present invention contemplates the provision of a horizontally extending supporting arm equipped with means whereby it may be rigidly fastened to the front lamp bracket and fender mounting, and otherwise rigidly fastened to the frame of the vehicle whereby its forward end may properly support an automobile bumper transversely of the vehicle frame.

The invention is illustrated by way of example in the accompanying drawings, in which:

Fig. 1 is an enlarged view in vertical section and elevation showing the mounting means for attaching the bumper bracket to the front lamp and fender mounting.

Fig. 2 is a view in plan showing a fragmentary portion of an automobile frame with the bumper mounting applied thereto.

Fig. 3 is a view in side elevation showing the bumper mounting.

Fig. 4 is a view in perspective showing the bracket fitting.

Fig. 5 is a view in transverse vertical section through the vehicle frame and the bumper bracket.

Referring more particularly to the drawings, 10 indicates the frame of an automobile which is suitably supported at its forward end on an axle 11 and wheels 12. Carried by this frame and at opposite sides thereof are lamp and fender mountings 13. These mountings comprise a lamp post 14 extending vertically and a fender bracket 15 extending obliquely therefrom. The two members 14 and 15 are formed integral with a base portion 16 having a flange 17 on its side by which the structure might be fastened to the frame member 10 by bolt 18.

The automobile bumper as indicated at 19 may be of any desired construction while supported by a horizontally extending bracket 20. This bracket as shown in the drawings, extends parallel to and substantially in the same horizontal plane as the frame 10, and as more clearly shown in Fig. 1, the bracket 20 extends alongside of the base portion 16 carrying the lamp post 14 and the inclined fender bracket 15.

A fitting 21 is provided to be fastened to the fender bracket member 15 and to be rigidly held so that the bumper bracket 20 may be supported therefrom. This fitting is formed with a saddle 22 which fits around the under face of the fender bracket arm 15 and rests against the base member 16. The saddle is formed with a continuation of a horizontal portion 23 through which a U bolt 24 extends. This U bolt is disposed in a vertical plane and passes around the fender bracket 15, as clearly shown in Fig. 1.

Formed integral with the fitting 21 and extending at right angles to the portion 23 is a vertical flange 25 which is formed with a semi-circular groove 26 in its upper edge to receive the under face of the bracket 15. The faces of the groove 26 and the saddle 22 which rest against the under face of the fender bracket 15 are in alignment and will be held firmly against the bracket by the action of the U bolt 24.

A downwardly extending flange 27 is formed as a part of the fitting 21 and carries bolts 28 and 29. These bolts pass through openings in the fender bracket 20. Due to the fact that the fitting 21 is supported out from the side of the main frame 10, it is necessary to bend the fender bracket 20 inwardly, as indicated at 29 in Fig. 2. It is then straightened to lie parallel to the side face of the side frame member 10 and may be fastened to a suitable bolt 30 carried by the frame member at a point considerably in the rear of the fender bracket lamp post.

In attaching an automobile bumper to the frame of a car of the Ford type by the brackets with which the present invention is concerned, the fitting 21 may be properly seated against the inclined fender bracket member 15 and there fastened by the U bolts 24. It will be apparent that the point of contact between the bracket 15 and the U bolt will be at a point between the points of contact of the saddle 22 and the groove 26, thus making a three point bearing which will hold the fitting in a rigid condition. The bracket 20 may then be fastened to the downwardly extending vertical flanges 27 of the fittings 21 by bolts 28 and 29, after which the rearwardly projecting ends 30 of the brackets may be secured to the frame by the bolts 31. A suitable style of bumper 19 may then be fastened to the forward ends of brackets 20.

It will thus be seen that by the use of the bumper bracket and fittings here shown, a bumper may be readily mounted upon an automobile of the Ford type without alteration of parts of the automobile and by means which will rigidly hold the bumper in position irrespective of vibration.

While I have shown the preferred form of my invention as now known to me, it is to be understood that various changes may be made in its construction without departing from the spirit of the invention as defined in the appended claims.

Having thus described my invention, what I claim and desire to secure by Letters Patent is:

1. A bumper mounting adapted to be anchored to an inclined fender supporting arm carried by a vehicle frame comprising a fitting formed with recessed seats spaced a distance from each other and within which seats said fender arm is positioned, fastening means engaging the arm on the opposite side from the seats and at a point intermediate the same, whereby the fitting will be rigidly secured to the arm, means carried by said fitting for holding a bumper bracket, and a bumper bracket fastened thereto.

2. In combination with an inclined fender supporting arm carried by an automobile frame, a bumper mounting comprising a fitting adapted to straddle said inclined member at two points remote from each other and bearing against the under side of said member, and fastening and engaging the supporting arm upon the opposite side from the fitting and at a point between the points of contact with said fitting, whereby the fitting will be rigidly secured to the arm, a downwardly extending flange formed as a part of said fitting, and a fender supporting arm fastened at a point intermediate its end to said flange and at its rear end to the main frame of the vehicle.

3. In combination with an inclined fender arm carried by an automobile frame, a bumper mounting comprising a fitting having a vertical flange and a horizontal flange substantially at right angles thereto, seats in the ends of said flanges for receiving the under side of the fender arm, a fastening member extending through the horizontal flange and embracing the fender arm at a point intermediate the two seats, and a bumper supporting arm fastened to said fitting at a point intermediate its ends and being secured at its rear end to the vehicle frame while supporting a bumper at its forward end.

4. In combination with an inclined fender supporting arm carried by an automobile frame, a fitting formed with a horizontal flange, the outer edge of which forms an arcuate seat, said fitting having a vertical flange extending upwardly from said horizontal portion and at the opposite end thereof from the seat formed therein, said vertical flange being formed with a recessed seat in its upper edge, the walls of the seats on the vertical and horizontal flanges being in alignment to conform to the under face of the fender supporting arm adapted to register therewith, a U bolt passing through the horizontal flange and embracing the fender supporting arm at a point between the seats of the flanges, a downwardly extending vertical flange formed as a part of said fitting, and a horizontally extending bumper arm fastened at a point intermediate its ends to said downwardly extending flange and being rigidly secured at its rear end to the vehicle frame while supporting a bumper at its forward end.

ROLLIE B. FAGEOL.